(12) United States Patent
Hiratsuka et al.

(10) Patent No.: US 7,535,666 B2
(45) Date of Patent: May 19, 2009

(54) DISK-TYPE STORAGE MEDIUM DRIVING APPARATUS AND DISK-TYPE STORAGE MEDIUM ROTATION SPEED CONTROL METHOD

(75) Inventors: Yukie Hiratsuka, Fujisawa (JP); Yukihide Inagaki, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/782,027

(22) Filed: Jul. 24, 2007

(65) Prior Publication Data

US 2008/0024903 A1 Jan. 31, 2008

(30) Foreign Application Priority Data

Jul. 25, 2006 (JP) ............... 2006-201906

(51) Int. Cl.
*G11B 15/46* (2006.01)
*G11B 5/09* (2006.01)
(52) U.S. Cl. ................. 360/73.03; 369/47.41
(58) Field of Classification Search ................ None
See application file for complete search history.

(56) References Cited

U.S. PATENT DOCUMENTS 5,659,799 A * 8/1997 Wu et al. .................... 710/57
5,982,570 A * 11/1999 Koizumi et al. .............. 360/69
6,710,961 B1 * 3/2004 Fujishima et al. ............ 360/69
2006/0227684 A1 * 10/2006 Hsu et al. ................ 369/47.41

FOREIGN PATENT DOCUMENTS

JP 2003272291 A * 9/2003
JP 2004-158149 6/2004

* cited by examiner

*Primary Examiner*—Jason C Olson
(74) *Attorney, Agent, or Firm*—Antonelli, Terry, Stout & Kraus, LLP.

(57) ABSTRACT

A rotation speed of a disk-type storage medium is suitably controlled in order to save power and to reduce noise in a disk-type storage medium driving apparatus provided with one or more communication interfaces. A disk-type storage medium driving apparatus that can switch rotation speed of a disk-type storage medium, to drive the disk-type storage medium, includes one or more communication interface units, which perform data transfer to and from peripheral devices; and a control unit that judges necessity of switching a rotation speed of the disk-type storage medium when there occurs a data transfer request through one of the communication interface units.

12 Claims, 9 Drawing Sheets

INTERFACE SPEED MANAGEMENT TABLE 113

| DATA TRANSFER I/F | INTERFACE DATA TRANSFER RATE INDEX VALUE |
|---|---|
| USB 2.0 | 320Mbps |
| IEEE 1394 | 600Mbps |
| eSATA | 1.5Gbps |
| IEEE 802.11a | 45Mbps |

FIG. 4

DATA TRANSFER RATE MANAGEMENT TABLE 114

| ROTATION SPEED | MEDIA DATA TRANSFER RATE INDEX VALUE |
|---|---|
| 2000rpm | 125Mbps — 250Mbps |
| 4000rpm | 250Mbps — 500Mbps |
| 8000rpm | 500Mbps — 1Gbps |
| 16000rpm | 1Gbps — 2Gbps |

| | INTERFACE DATA TRANSFER RATE INDEX VALUE | DATA TRANSFER RATE INDEX VALUE AT CURRENT ROTATION SPEED | REQUIRED DATA TRANSFER RATE |
|---|---|---|---|
| 1 | MAXIMUM VALUE OF EFFECTIVE DATA TRANSFER RATE | MAXIMUM VALUE OF MEDIA DATA TRANSFER RATE | ADDITION |
| 2 | MAXIMUM VALUE OF EFFECTIVE DATA TRANSFER RATE | MAXIMUM VALUE OF MEDIA DATA TRANSFER RATE | ADDITION AND MULTIPLICATION WITH PREDETERMINED RATIO |
| 3 | MAXIMUM VALUE OF EFFECTIVE DATA TRANSFER RATE | MINIMUM VALUE OF MEDIA DATA TRANSFER RATE | ADDITION |
| 4 | MAXIMUM VALUE OF EFFECTIVE DATA TRANSFER RATE | MINIMUM VALUE OF MEDIA DATA TRANSFER RATE | ADDITION AND MULTIPLICATION WITH PREDETERMINED RATIO |

| | |
|---|---|
| THEORETICAL VALUE OF DATA TRANSFER RATE | AVERAGE OF MEDIA DATA TRANSFER RATE |
| THEORETICAL VALUE OF DATA TRANSFER RATE MULTIPLIED BY COEFFICIENT | CONTINUOUS DATA TRANSFER RATE |
| MEASURED VALUE | MEASURED VALUE |
| EXPERIMENTAL VALUE | EXPERIMENTAL VALUE |
| ⋮ | ⋮ |

FIG. 9

| NEW PROCESSING \ CURRENT PROCESSING | NONE | RECORDING | REPLAY | USB 2.0 | IEEE 1394 | eSATA | IEEE 802.11a |
|---|---|---|---|---|---|---|---|
| RECORDING | 2000rpm | 2000rpm | 3000rpm | 7000rpm | 9000rpm | 15000rpm | 2000rpm |
| REPLAY | 3000rpm | 3000rpm | 4000rpm | 8000rpm | 10000rpm | 15000rpm | 3000rpm |
| USB 2.0 | 4000rpm | 7000rpm | 8000rpm | 10000rpm | 13000rpm | 15000rpm | 4000rpm |
| IEEE 1394 | 6000rpm | 9000rpm | 10000rpm | 13000rpm | 15000rpm | 15000rpm | 6000rpm |
| eSATA | 15000rpm | 15000rpm | 15000rpm | 15000rpm | 15000rpm | 15000rpm | 15000rpm |
| IEEE 802.11a | 2000rpm | 2000rpm | 3000rpm | 4000rpm | 6000rpm | 15000rpm | 2000rpm |

DISK-TYPE STORAGE MEDIUM DRIVING APPARATUS AND DISK-TYPE STORAGE MEDIUM ROTATION SPEED CONTROL METHOD

FIELD OF THE INVENTION

The present invention relates to a disk-type storage medium driving apparatus that drives a disk-type storage medium, and particularly to a disk-type storage medium driving apparatus that can drive a disk-type storage medium at a plurality of rotation speeds.

BACKGROUND OF THE INVENTION

Conventionally, a disk-type storage medium driving apparatus, particularly a hard disk drive that uses a hard disk as a disk-type storage medium, has a hard disk rotation speed (i.e. the number of rotations per unit time) that is specific to the apparatus and determined by its specifications, the rotation speed not being changed when the apparatus is used.

For a case of a video recording apparatus that uses an optical disk such as a DVD or the like, Patent Document 1 (Japanese Unexamined Patent Application Laid-Open No. 2004-158149) describes a rotation speed of a disk being changed to a low speed mode at the time of taking a video, in order to reduce effects such as noise and vibration caused by high speed disk rotation.

SUMMARY OF THE INVENTION

Recently, with respect to hard disk drives also, techniques that permit switching of rotation speeds have been proposed.

Generally, a higher rotation speed leads to a higher data transfer rate when storage density is the same. Accordingly, when a rotation speed is raised, data transfer performance of a disk-type storage medium driving apparatus is improved.

However, there is a problem in that as rotation speed is increased, power consumption and noise increase. Further, a disk-type storage medium driving apparatus is not always required to operate at top performance data transfer rate.

Accordingly, when a disk-type storage medium driving apparatus is arranged such that its disk rotation speed can be switched, there is a need of devising a method of controlling rotation speed.

In particular, control of rotation speed is much more important in cases of a disk-type storage medium driving apparatus that has one or more communication interfaces and can perform various kinds of processing, since data transfer rate required in such a disk-type storage medium driving apparatus changes.

An object of the present invention is to suitably control rotation speed of a disk-type storage medium in a disk-type storage medium driving apparatus having one or a plurality of communication interfaces, in order to save power and to reduce noise.

To solve the above problem, the present invention provides a disk-type storage medium driving apparatus that can drive a disk-type storage medium by switching rotation speeds of the disk-type storage medium, comprising: one or more communication interface units, which manage data transfer to and from peripheral devices; and a control unit that judges necessity of switching a rotation speed of the disk-type storage medium when there occurs a data transfer request through one of the communication interface units.

Here, it is possible that the disk-type storage medium driving apparatus further comprises an interface management table recording a data transfer rate index value for each communication interface unit and a media management table recording a data transfer rate index value for each rotation speed that can be switched; and the control unit acquires a data transfer rate index value that is considered necessary on the basis of the data transfer rate index value at a rotation speed before the data transfer request and the data transfer rate index value of the interface unit relating to the data transfer request, and determines a rotation speed that satisfies the acquired data transfer rate index value, to judge necessity of switching the rotation speed.

In detail, the data transfer rate index value recorded for each communication interface unit in the interface management table can be an effective value of a data transfer rate, and the data transfer rate index value recorded for each rotation speed in the media management table can be a media data transfer rate.

Further, it is possible that the control unit adds the data transfer rate index value at the rotation speed before the data transfer request to the data transfer rate index value of the interface unit relating to the data transfer request, and takes an acquired sum or the sum multiplied with a predetermined value as the data transfer rate index value that is considered necessary.

According to the present invention, rotation speed of a disk-type storage medium is controlled giving consideration to data transfer rate of a communication interface and data transfer rate for each rotation speed. Thus, the rotation speed of the disk-type storage medium can be suitably controlled in a disk-type storage medium driving apparatus provided with one or more communication interfaces.

DESCRIPTION OF THE PREFERRED EMBODIMENTS

An embodiment of the present invention will be described referring to the drawings. In the following the present embodiment describes cases where the present invention is applied to a hard disk recorder as a disk-type storage medium driving apparatus.

Generally, a hard disk recorder has a hard disk drive, a television tuner and the like within it, and can record and replay a television program or the like as its basic function. The hard disk recorder of the present invention further has a plurality of communication interfaces so that it can perform data communication with peripheral devices.

The present invention is not limited to a hard disk recorder, and can be widely applied to a personal computer, a video recording/reproducing apparatus, an audio system and other information processing apparatuses, each having a hard disk drive or the like within it. Further, as described below, the present invention can be applied to a hard disk driving apparatus itself. Further, a disk-type recording medium is not limited to a hard disk.

Figure 1:
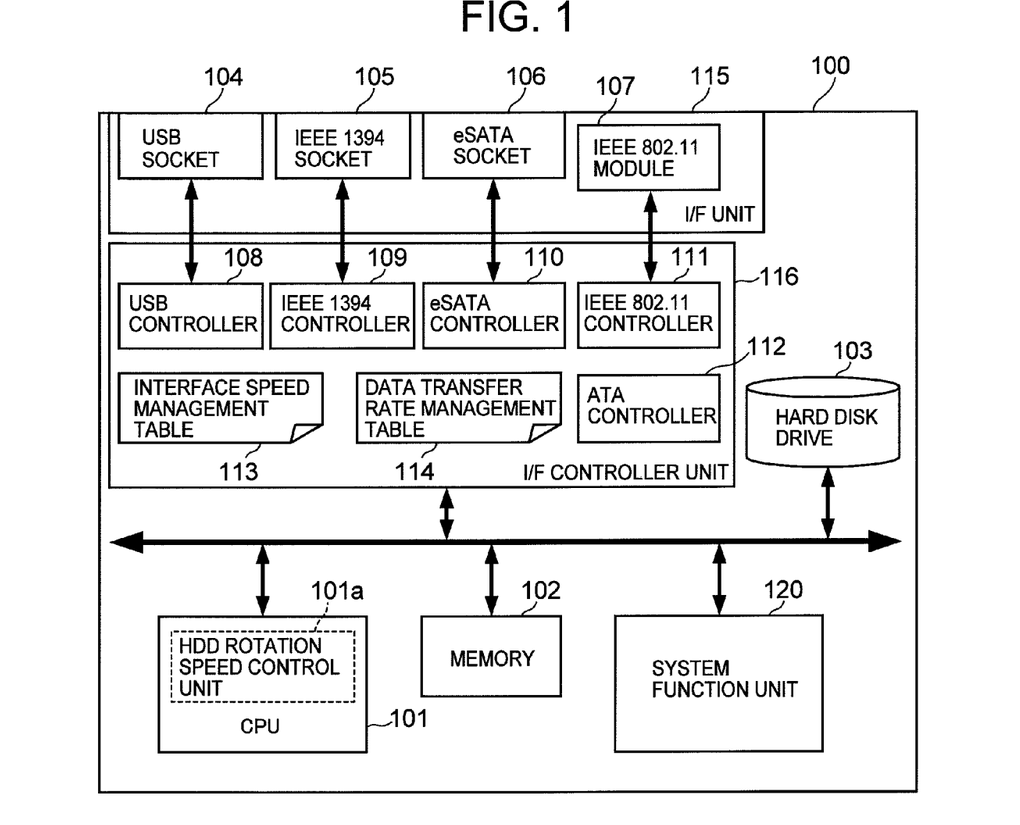
FIG. 1 is a block diagram showing a configuration of a hard disk recorder.

FIG. 1 is a block diagram showing a configuration of the hard disk recorder 100 according to the present embodiment. This figure shows a hardware configuration relating mainly to communication interfaces and a hard disk drive.

As shown in the figure, the hard disk recorder 100 comprises a CPU 101, a memory 102, a hard disk drive 103, an interface (I/F) unit 115, an interface (I/F) controller unit 116 and a system function unit 120.

Here, the system function unit 120 collectively designates the other function units, such as, for example, a television tuner, a user interface unit, a power supply unit, and the like, that are required for the hard disk recorder 100 to work as a hard disk recorder.

Rotation speeds of the hard disk drive 103 of the hard disk recorder 100 can be switched in operation. In the present embodiment, it is assumed that the hard disk drive 103 can operate at 2000 rpm, 4000 rpm, 8000 rpm and 16000 rpm. Data transfer performance of the hard disk drive 103 becomes higher for higher rotation speed, although power consumption and noise also increase.

The present description does not refer to a mechanism for switching rotation speeds and data read/write processing, and the like. Well known techniques published in technical papers and the like can be employed for these.

The I/F unit 115 comprises a plurality of communication interface sockets and radio modules. In the example of FIG. 1, it is assumed that the I/F unit 115 comprises a USB socket 104, an IEEE 1394 socket 105, an eSATA socket 106, and an IEEE 802.11 module 107. These are examples, and the I/F unit 115 may comprise another communication interface socket or module for wired or wireless communication. For example, the I/F unit 115 may comprise a Bluetooth (trade name) module or the like.

These communication interfaces have hot swap functionality, and a peripheral device can be connected to and removed from the hard disk recorder 100 without turning off the power of the hard disk recorder 100.

The I/F controller unit 116 is a function unit that controls data communication using the communication interfaces, and comprises controller function units corresponding to the I/F unit 115. In the example shown in the figure, the I/F controller unit 116 comprises a USB controller 108, an IEEE 1394 controller 109, an eSATA controller 110, an IEEE 802.11 controller 111, and an ATA controller 112 for controlling data communication with the hard disk drive 103.

The I/F controller unit 116 monitors respective connection states of the interfaces, and detects connection and removal of a peripheral device to perform necessary processing.

Figure 2:
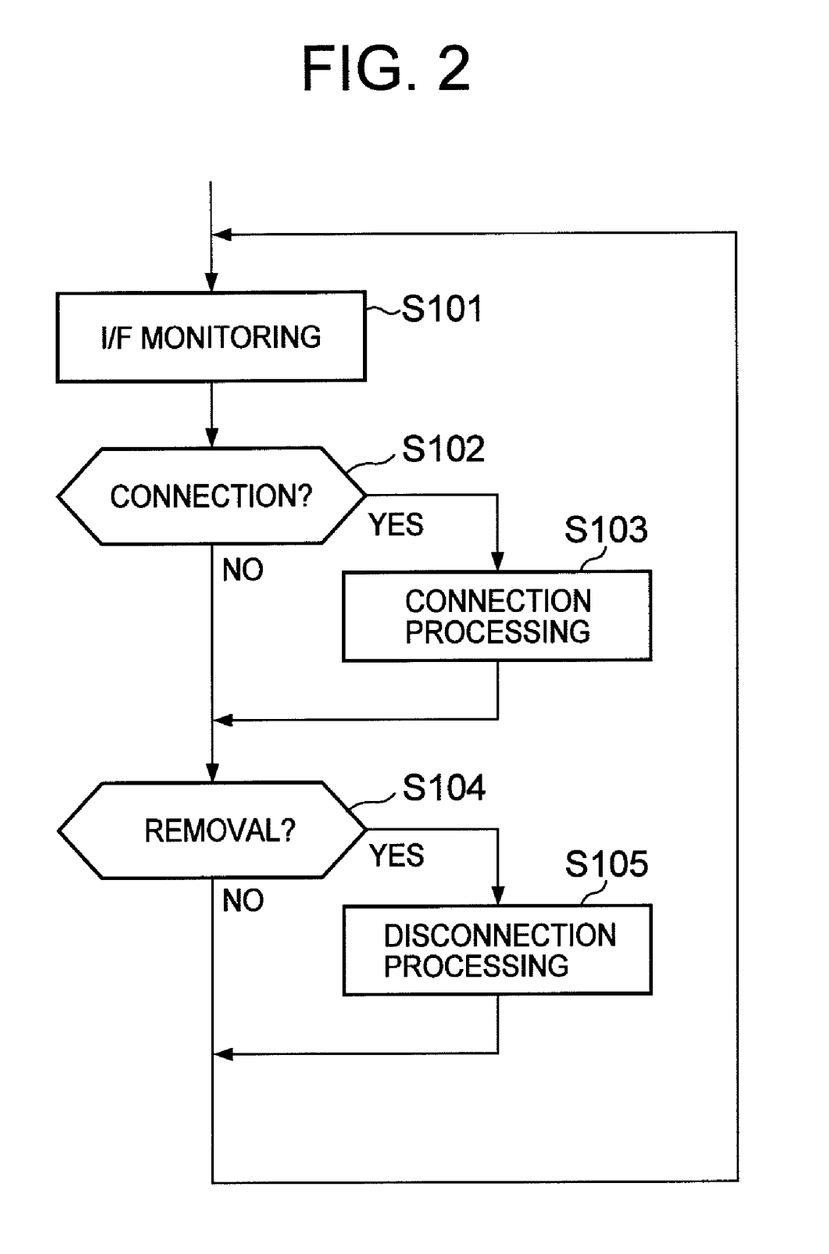
FIG. 2 is a flowchart showing processing relating to monitoring of interfaces.

FIG. 2 is a flowchart showing flow of processing relating to monitoring of the interfaces. As shown in the figure, the I/F controller unit 116 monitors each interface (S101). When connection of a peripheral device is detected (S102: Y), the I/F controller unit 116 performs connection processing corresponding to the interface in question and the connected peripheral device (S103). Further, when removal of a peripheral device is detected (S104: Y), the I/F controller unit 116 performs removal processing corresponding to the interface in question and the removed peripheral device (S105). There are cases in which removal of peripheral device requires prescribed pre-processing before removal.

By the I/F controller unit 116 monitoring the interfaces, an HDD rotation speed control unit 101a of the CPU 101 can grasp a connection state of each interface. The connection state of each interface may be managed using flags, for example.

The I/F controller unit 116 further comprises an interface speed management table 113 and a data transfer rate management table 114. The interface speed management table 113 records an index value for data transfer rate of each communication interface provided to the hard disk recorder 100, and the data transfer rate management table 114 records an index value for a data transfer rate at each rotation speed of the hard disk drive 103 provided to the hard disk recorder 100.

Figure 3:
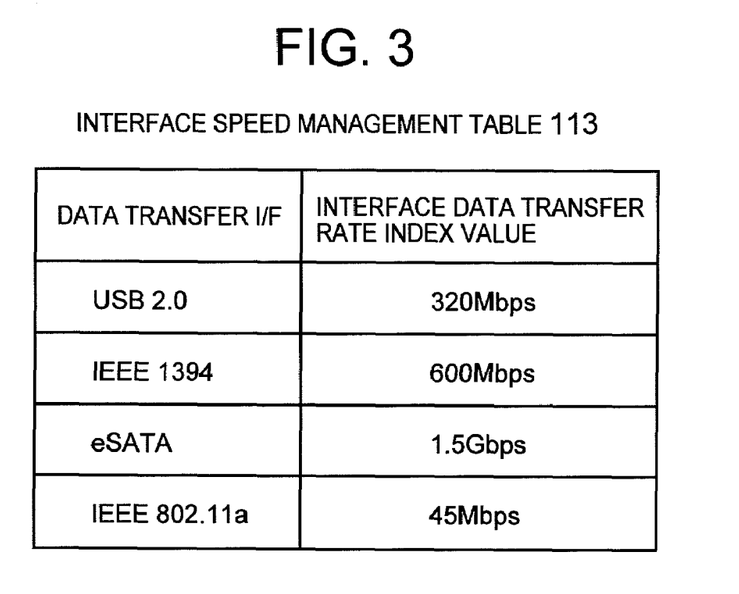
FIG. 3 is a diagram showing an example of an interface speed management table.

FIG. 3 is a diagram showing an example of the interface speed management table 113. In the present embodiment, the maximum value of an estimated effective data transfer rate is used as an index value for the data transfer rate of an interface. However, the index value is not limited to the maximum value of the effective data transfer rate, and another value can be used as the index value. For example, a theoretical value of the data transfer rate, or a theoretical value of the data transfer rate multiplied by a predetermined coefficient, an experimental value, or a measured value may be used.

Figure 4:
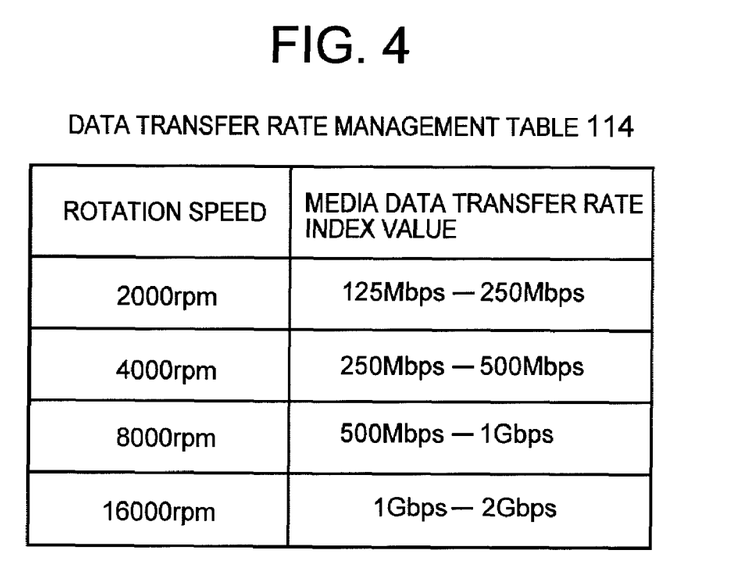
FIG. 4 is a diagram showing an example of a data transfer rate management table.

FIG. 4 is a diagram showing an example of the data transfer rate management table 114. In the present embodiment, a media data transfer rate (which is also called an internal data transfer rate) is used as the index value for the data transfer rate of the hard disk drive 103, and the data transfer rate management table 114 records a value for each rotation speed. Since recording capacity per track of an outer circumference of a hard disk is different from that of an inner circumference, the media data transfer rate is recorded as a range indicated by the minimum value and the maximum value. Here, however, either of the minimum value and the maximum value may be recorded.

Further, the index value is not limited to a media data transfer rate, and another value may be used as the index value. For example, continuous data transfer rate, an experimental value, or a measured value, which are considered to be closer to an effective value, may be used.

In the present embodiment, the HDD rotation speed control unit 101a is virtually realized in the CPU 101. The HDD rotation speed control unit 101a is realized when the CPU 101 executes a control program stored in the memory 102. However, the HDD rotation speed control unit 101a may be realized by hardware.

The HDD rotation speed control unit 101a refers to the above-mentioned interface speed management table 113 and the data transfer rate management table 114 in order to control the rotation speed of the hard disk drive 103, with data transfer processing through the I/F unit 115 as one judgment criterion.

Figure 5:
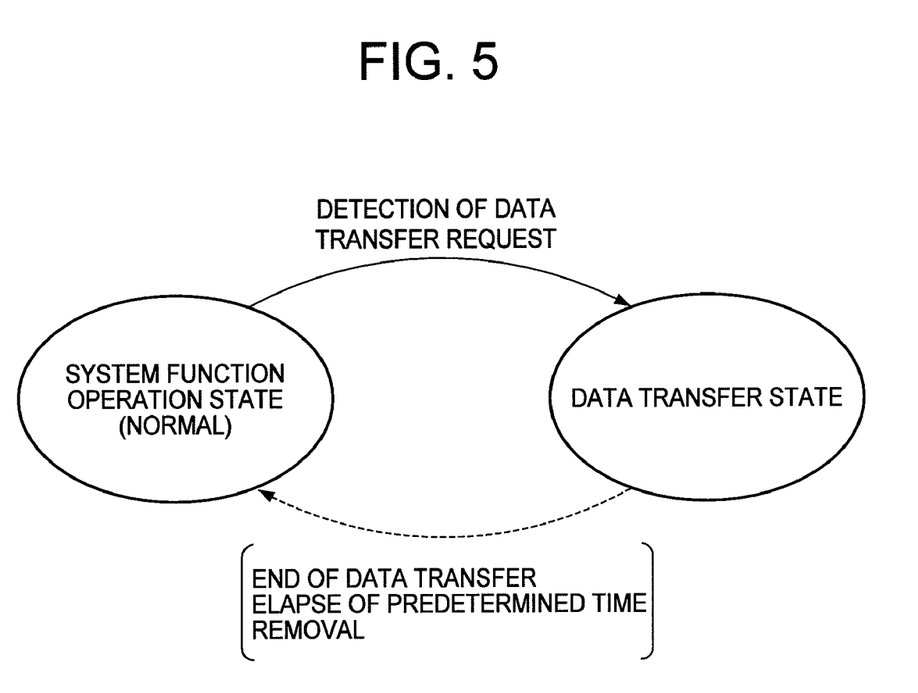
FIG. 5 is a diagram showing state transition of the hard disk recorder.

The hard disk recorder 100 has, as its primary function, a function of recording and reproducing a television program or the like. Here, an ordinary state in which recording/reproducing is performed, without transferring data through a communication interface, is referred to as a system function operation state. It is assumed that the ordinary state includes a standby state also. A state in which data are transferred through a communication interface is referred to as a data transfer state, and the hard disk recorder 100 performs a state transition, as shown in FIG. 5.

When a request for data transfer to or from an external peripheral device through a communication interface is detected in the ordinary system function operation state, then the state transitions to the data transfer state.

Here, it is assumed that a data transfer request is sent from an external peripheral device. However, the present invention can be applied to cases where the hard disk recorder 100 makes a data transfer request.

On the other hand, when data transfer is finished in the data transfer state, then the state transitions to the system function operation state. When data transfer is finished with for a certain interface, while data transfer is not finished for another interface, then the data transfer state continues.

However, depending on specifications or the like, of an interface, sometimes end of data transfer cannot be recognized. In such cases, it is possible to consider that data transfer is finished at the time when a predetermined time elapses from a data transfer request or when the peripheral device concerned is removed.

In the case where an information processing apparatus, such as a personal computer, is used as a disk-type storage medium driving apparatus, a state in which a CPU is executing, for example, an arithmetic operation or reproducing from a medium, without transferring data through a communication interface, corresponds to the system function operation state.

Next, rotation speed control processing of the hard disk drive 103 of the present embodiment will be described.

Figure 6:
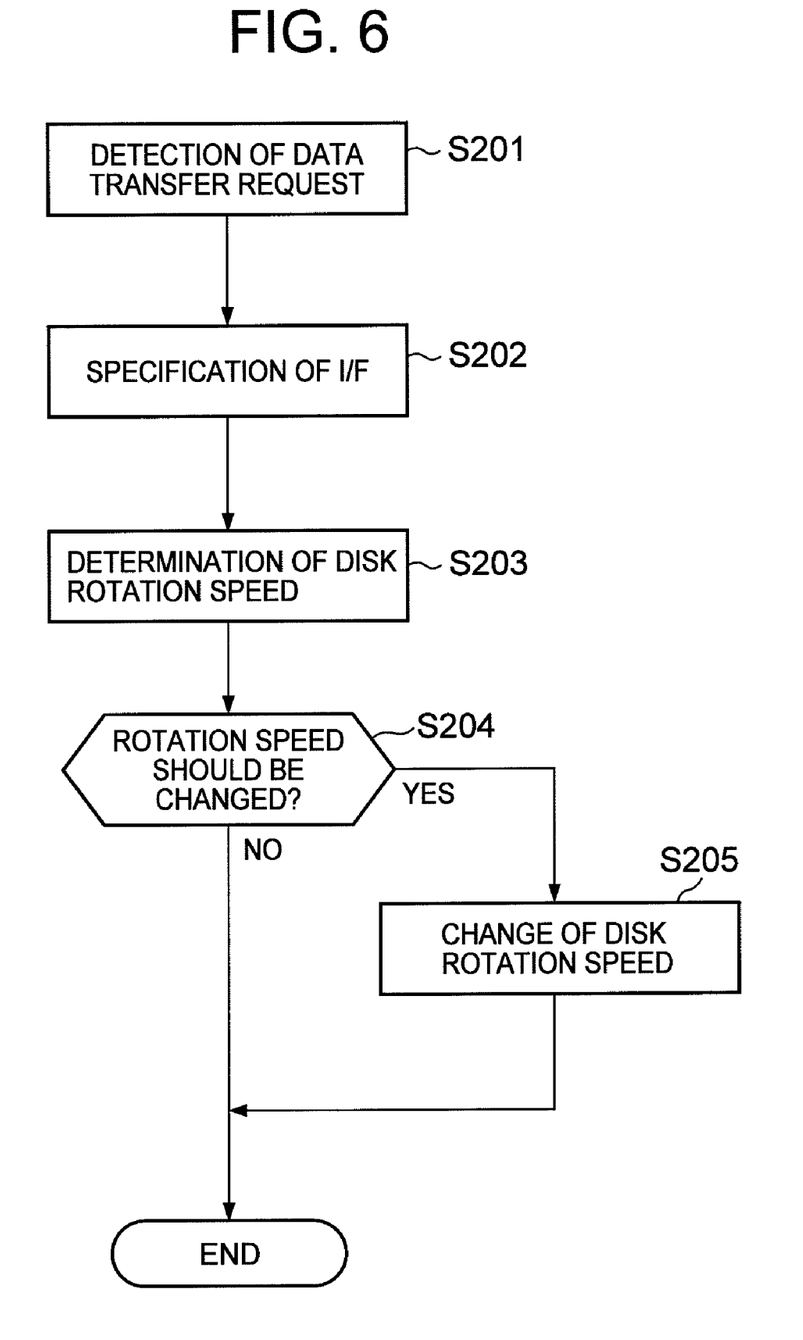
FIG. 6 is a flowchart showing an outline of rotation speed control processing in the hard disk recorder.

First, an outline of the rotation speed control processing will be described referring to FIG. 6. FIG. 6 is a flowchart showing an outline of the rotation speed control processing of the hard disk drive 103.

As shown in the figure, this processing is started when the HDD rotation speed control unit 101a detects a request for data transfer through some interface (S201). That is to say, control of the rotation speed is performed when the system function operation state transitions to the data transfer state.

The HDD rotation speed control unit 101a specifies the interface for which the transfer request has occurred among the interfaces provided to the hard disk recorder 100 (S202).

Then, the rotation speed of the hard disk drive 103 is determined taking the specified interface through which data transfer is to be performed as one judgment criterion (S203). A detailed method of determining the rotation speed will be described later.

When the determined rotation speed is different from the current rotation speed or, in other words, when the rotation speed should be changed (S204: Y), the rotation speed is changed to the determined rotation speed (S205). An instruction to change the rotation speed is given to the hard disk drive 103 by using, for example, a "Set feature" command.

Thus, the present invention is technically characterized in that an interface through which data transfer is performed is taken as one judgment criterion in determining the rotation speed of the hard disk drive 103. That is to say, since it is considered that a data transfer rate required of the hard disk drive 103 changes depending on the interface through which data transfer is performed, the interface through which data transfer is performed is taken as one judgment criterion in controlling the rotation speed of the hard disk drive 103.

Next, a detailed method of determining the rotation speed of the hard disk drive 103 will be described. In the present embodiment, a method of determination based on the current rotation and a method of determining the rotation speed directly will be described.

First, a method of determining the rotation speed on the basis of the current rotation speed will be described.

Figure 7:
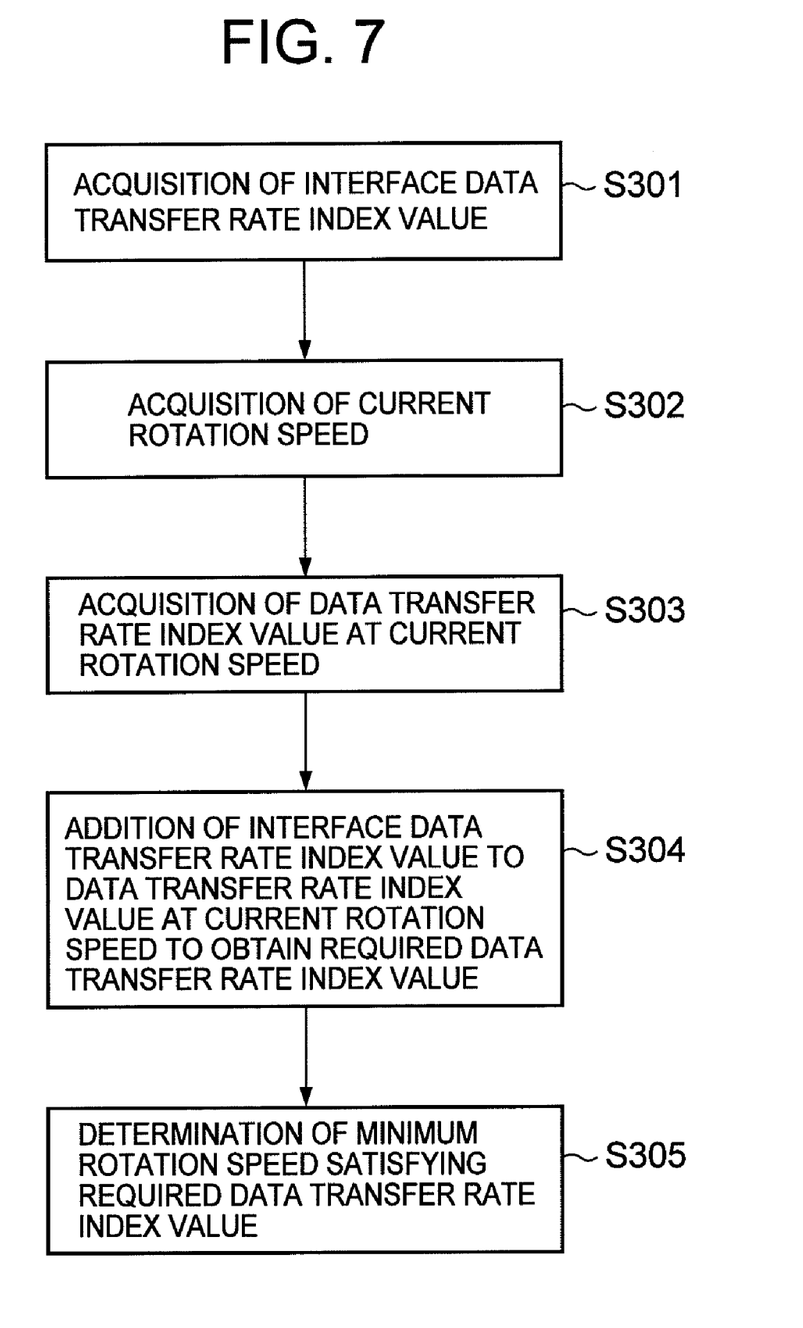
FIG. 7 is a flowchart for explaining a method of determining rotation speed on the basis of the current rotation speed.

FIG. 7 is a flowchart for explaining a method of determining the rotation speed on the basis of the current rotation speed. In this method, first the data transfer rate index value, i.e. the maximum value of the effective data transfer rate in the present embodiment, of the interface through which data transfer is to be performed, is acquired by referring to the interface speed management table 113 (S301).

Further, the current rotation speed of the hard disk drive 103 is acquired (S302).

Then, the data transfer rate index value, i.e., the media data transfer rate in the present embodiment, at the current rotation speed of the hard disk drive 103 is acquired by referring to the data transfer rate management table 114 (S303).

As described above, the media data transfer rate is recorded as a range of the minimum value to the maximum value. Here, it is assumed that the maximum value is acquired.

Then, the acquired interface data transfer rate index value is added to the data transfer rate index value at the current rotation speed (S304). In the present embodiment, the maximum value of the effective data transfer rate of the interface through which data transfer is to be performed is added to the maximum media data transfer rate at the current rotation speed of the hard disk.

The obtained sum is taken as a reference value for a data transfer rate required when data transfer is performed, and is referred to as a required data transfer rate.

When the required data transfer rate is calculated, the data transfer rate management table 114 is referred to again, in order to extract a rotation speed corresponding to a media data transfer rate satisfying the required data transfer rate, and the extracted rotation speed becomes the determined rotation speed (S305). Here, it is assumed that the minimum rotation speed among rotation speeds, whose minimum values of media data transfer rates exceed the required data transfer rate, is extracted and becomes the determined rotation speed.

In other words, a rotation speed that is considered the necessary minimum is employed. As a result, it is possible to curtail power consumption and noise generation while curtailing speed reduction in the transfer rate when data is transferred.

The above processing will be further described using a detailed example. For example, it is assumed that a data transfer request has occurred through IEEE 802.11a radio communication when the current rotation speed is 2000 rpm.

The interface speed management table 113 is referred to in accordance with the processing (S301), and the maximum value 45 Mbps of the IEEE 802.11a effective data transfer rate is acquired.

Further, the data transfer rate management table 114 is referred to according to the processing (S303), and the maximum value 250 Mbps of the media data transfer rate at the current rotation speed 2000 rpm is acquired.

Then, 45 Mbps is added to 250 Mbps to obtain 295 Mbps as the required data transfer rate.

Referring to the data transfer rate management table 114, 8000 rpm and 16000 rpm are rotation speeds at which minimum values of the media data transfer rates exceed the required data transfer rate 295 Mbps. Among these rotation speeds, the smaller rotation speed of 8000 rpm is determined as the rotation speed.

In the above embodiment, "the maximum value of the media data transfer rate" is used as the index value for the data transfer rate at the current rotation speed.

However, the present invention is not restricted to this example. For example, "the minimum value of the media data transfer rate" may be used as the index value for the data transfer rate at the current rotation speed.

A detailed example for such a case is shown in the following. In this example too, it is assumed that a data transfer request has occurred through IEEE 802.11a radio communication when the current rotation speed is 2000 rpm.

Referring to the interface speed management table 113 according to the processing (S301), a maximum value of 45 Mbps of the IEEE 802.11a effective data transfer rate is acquired.

Further, referring to the data transfer rate management table 113 in accordance with the processing (S303), the minimum value 125 Mbps of the media data transfer rate at the current rotation speed 2000 rpm is acquired.

Then, 45 Mbps is added to 125 Mbps to obtain 170 Mbps as the required data transfer rate.

Referring to the data transfer rate management table 114, 4000 rpm, 8000 rpm and 16000 rpm are rotation speeds at which minimum values of the media data transfer rates exceed the required data transfer rate 170 Mbps. Among these rotation speeds, the smaller rotation speed of 4000 rpm is determined as the rotation speed.

In the above examples, the interface data transfer speed index value is added to the data transfer rate index value at the current rotation speed in order to acquire the required data transfer rate.

However, the present invention is not restricted to these examples. For example, it is possible that the interface data transfer rate index value is added to the data transfer rate at the current rotation speed, and the acquired sum is multiplied by a predetermined ratio, taking the result as the required data transfer rate. The predetermined ratio is determined in advance on an experimental base.

Figure 8:
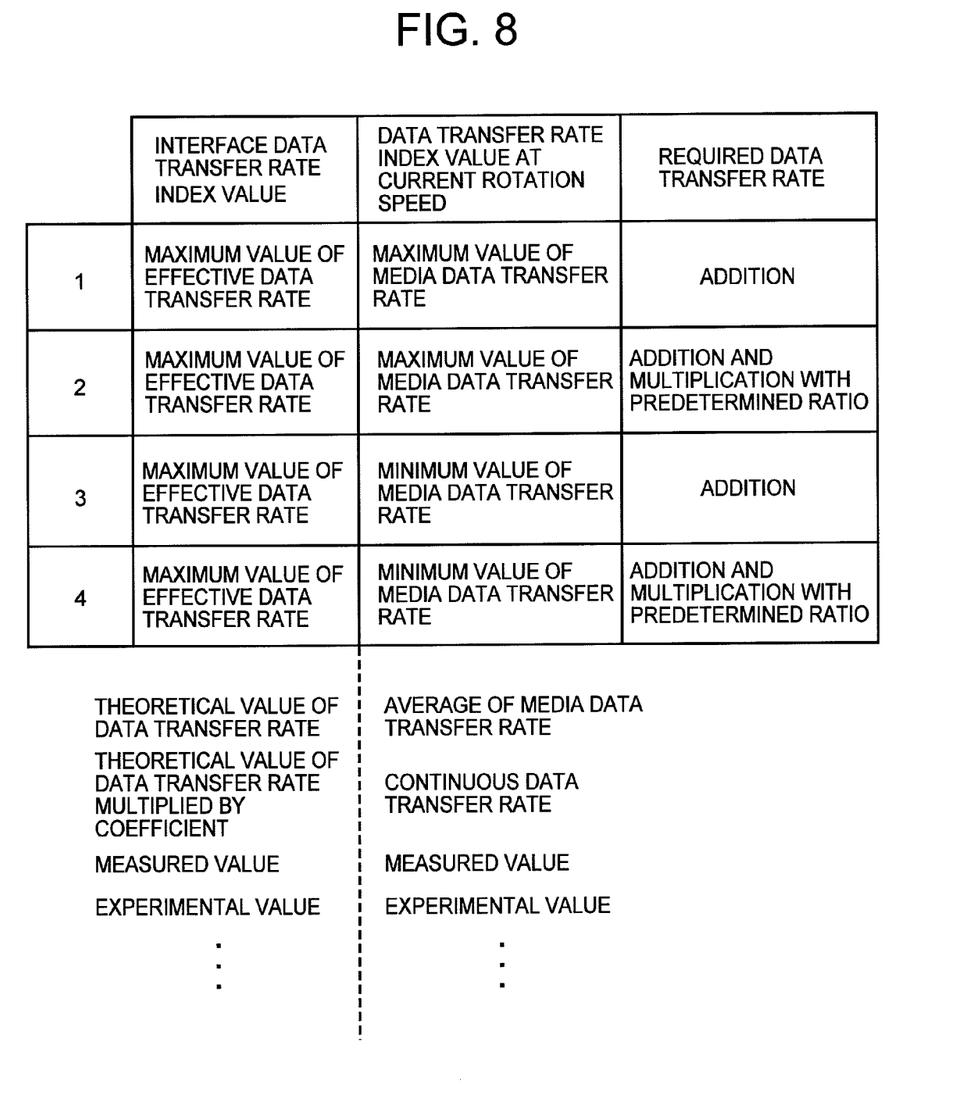
FIG. 8 is a diagram for explaining an example of each index value.

FIG. 8 shows the above examples together in a table. This figure shows specific combinations 1 to 4 of the interface data transfer speed index value, the data transfer rate index value at the current rotation speed, and the required data transfer rate within the framework.

For example, "1" in the table shows addition of the maximum value of the effective data transfer rate to the maximum value of the media data transfer rate, as the method of acquiring the required data transfer rate. "2" in the table shows addition of the maximum value of the effective data transfer rate to the maximum value of the media data transfer rate and multiplication of the obtained sum by the predetermined ratio, as the method of acquiring the required data transfer rate.

Outside the framework, the figure shows other examples of the interface data transfer rate index value and the data transfer rate index value at the current rotation speed.

For example, it is shown that a data transfer rate theoretical value, a data transfer rate theoretical value multiplied with a coefficient, a measured value, an experimental value, or the like, can be used as the interface data transfer speed index value. It is shown that a media data transfer rate average, a continuous data transfer rate, a measured value, an experimental value, or the like, can be used as the data transfer rate index value at the current rotation speed.

Clearly, the present invention is not restricted to the shown methods of calculating the required data transfer rate, and other calculation methods may be used.

The above examples have been described taking cases where the rotation speed is increased at the start of data transfer. It is possible to control the rotation speed such that the rotation speed returns to normal one when the data transfer state transitions to the system function operation state, for example.

Next, the method of determining the rotation speed directly without referring to the current rotation speed will be described.

Figure 9:
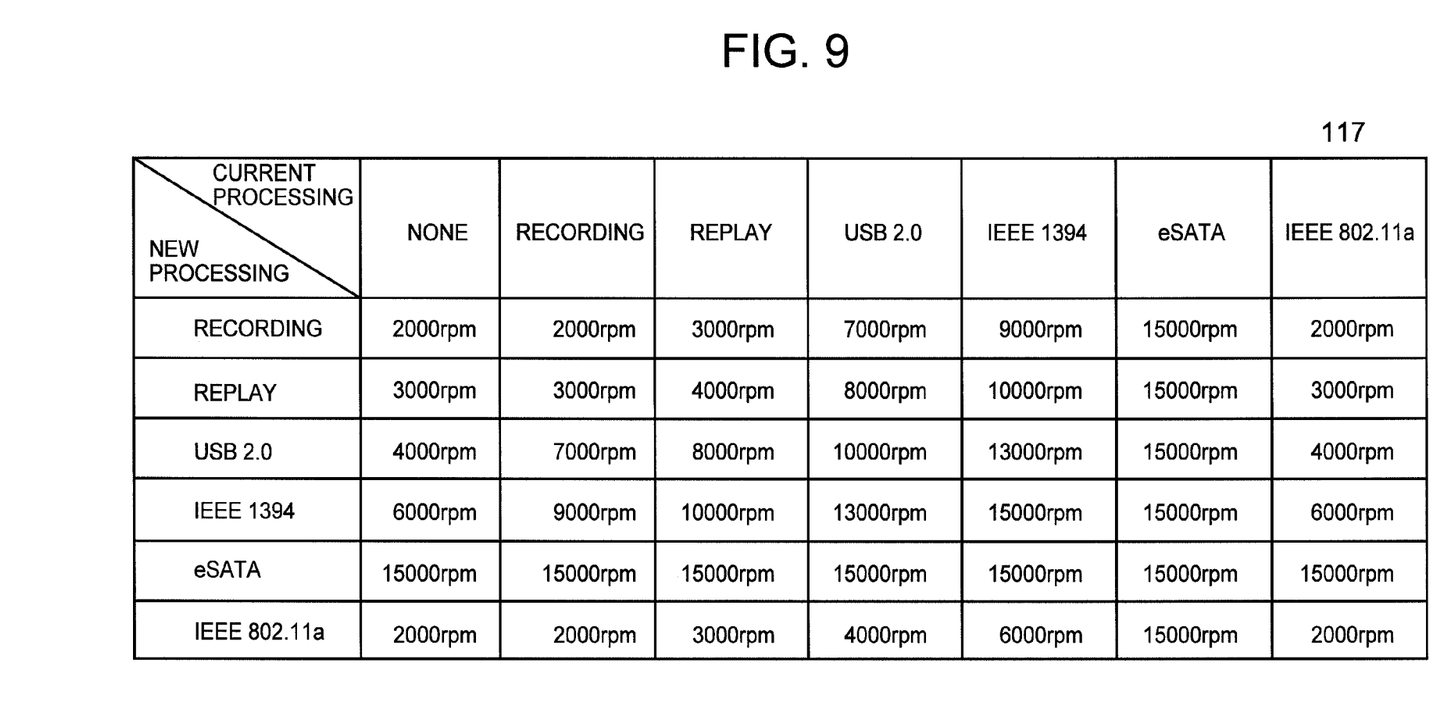
FIG. 9 is a diagram showing an example of a rotation speed management table.

In this case, a rotation speed management table 117 is used instead of the interface speed management table 113 and the data transfer rate management table 114.

FIG. 9 is a diagram showing an example of the rotation speed management table 117. As shown in the figure, the rotation speed management table 117 is a table that determines the required rotation speed for new processing (such as data transfer) to be performed, with respect to each combination of the current processing and the processing to be performed next. In this example, not only data transfer but also recording processing and replay processing are factors that determine the rotation speed. Accordingly, the rotation speed is changed not only when a data transfer request is received but also when a recording instruction or a replay instruction is received from a user.

However, the format of the rotation speed management table 117 is not restricted to the example shown in the figure. For example, the rotation speed may be determined depending on combinations of communication formats. Further, there may be used a table that considers the case where data are transferred employing three or more communication formats at the same time.

According to the example shown in the figure, in the case where recording is to be started from a state in which neither recording nor replay is being performed, 2000 rpm indicated by a combination of "Current processing: None" and "New processing: Recording" is determined as the rotation speed after change.

Further, in cases where data transfer is to be performed according to IEEE 1394 from a state in which data communication is being performed by USB2.0, 13000 rpm indicated by a combination of "Current processing: USB2.0" and "New processing: IEEE 1394" is determined as the required rotation speed. Accordingly, the minimum rotation speed 16000 rpm that satisfies the required rotation speed is determined as the rotation speed after change.

In this example, the rotation speed management table 117 defines required rotation speeds, which do not necessarily coincide with rotation speeds that can changed by the hard disk drive 103. Clearly, the rotation speed management table 117 can be made to enable correspondence with the changeable rotation speed.

The rotation speed management table 117 of the present embodiment or the above-described data transfer rate management table 114 is made to correspond with the hard disk drive 103. However, when the hard disk drive 103 is changed or a new hard disk drive is added, such a table may be generated by acquiring the information on the hard disk drive 103 by using an "Identify" command or the like. Alternatively, such a table may be generated when the disk-type storage medium driving apparatus is activated, for example.

Figure 10:
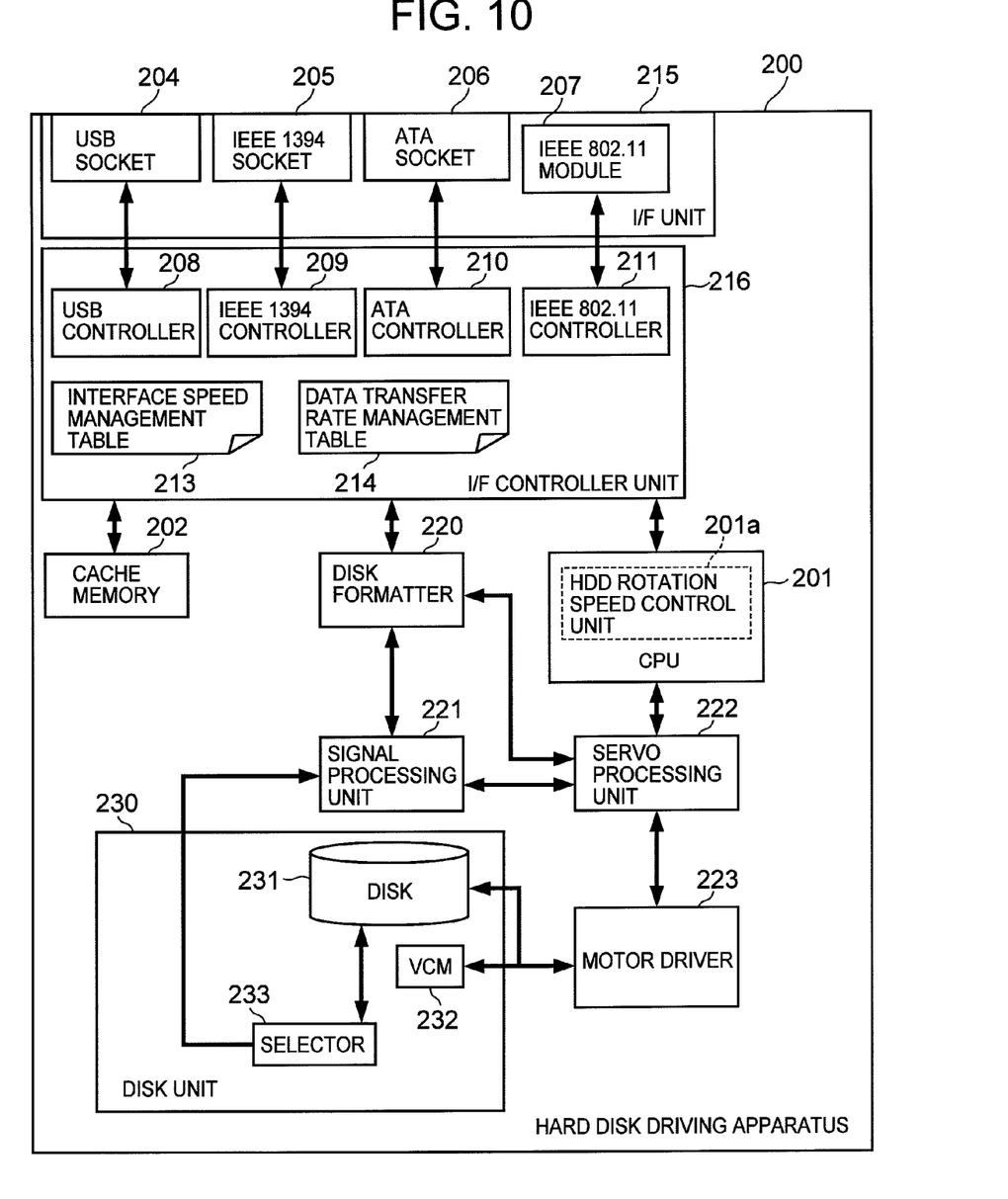
FIG. 10 is a block diagram showing a configuration of a hard disk driving apparatus.

Next, an explanation is given of a configuration in cases where the disk-type storage medium driving apparatus of the present invention is applied to a hard disk driving apparatus itself. FIG. 10 is a block diagram showing a configuration of a hard disk driving apparatus 200.

The hard disk driving apparatus 200 comprises a CPU 201, a cache memory 202, an interface (I/F) unit 215, an interface (I/F) controller unit 216, a disk formatter 220, a signal processing unit 221, a servo processing unit 222, a motor driver 223, and a disk unit 230. An HDD rotation speed control unit 201a is virtually realized in the CPU 201.

The disk formatter 220, the signal processing 221, the servo processing unit 222, the motor driver 223, and the like, may be configured as in conventional technology.

The disk unit 230 comprises a disk 231, a VCM 232, and a selector 233, and operation is possible in which rotation speeds of the disk 231 are switched.

The I/F unit 215 comprises a plurality of communication interface sockets and radio modules. In the example of FIG. 10, it is assumed that the I/F unit 215 comprises a USB socket 204, an IEEE 1394 socket 205, an ATA socket 206 and an IEEE 802.11 module 207. These are examples, and the IF unit 215 may comprise another communication interface socket or module for wired or wireless communication. For example, the I/F unit 215 may comprise a Bluetooth (trade name) module or the like.

These communication interfaces have hot swap functionality, and a peripheral device can be connected to and removed from the hard disk driving apparatus 200 without turning off the power of the hard disk driving apparatus 200.

The I/F controller unit 216 is a function unit that controls data communication using the communication interfaces, and comprises controller function units corresponding to the I/F unit 215. In the example shown in the figure, the I/F controller unit 216 comprises a USB controller 208, an IEEE 1394 controller 209, an ATA controller 210, and an IEEE 802.11 controller 211.

The I/F controller unit 216 further comprises an interface speed management table 213 and a data transfer rate management table 214. The interface speed management table 213 records an index value for a data transfer rate of each communication interface provided to the hard disk driving apparatus 200, and the data transfer rate management table 214 records an index value for data transfer rate at each rotation speed of the disk 231 provided to the hard disk driving apparatus 200.

Rotation control performed by the hard disk driving apparatus 200 having the above configuration is similar to the rotation control performed by the above-described hard disk recorder 100, and its description is omitted.

The present invention is not restricted to the above-described embodiments, and can have various arrangements without departing from the spirit and scope of the invention.

The invention claimed is:

1. A disk-type storage medium driving apparatus that can switch rotation speed of a disk-type storage medium to drive the disk-type storage medium, comprising:
   at least one communication interface unit, which performs data transfer to and from peripheral devices;
   a control unit that judges necessity of switching rotation speed of the disk-type storage medium when there occurs a data transfer request through any of the at-least-one communication interface unit;
   an interface management table in which a data transfer rate index value is recorded for each communication interface unit, and a media management table in which a data transfer rate index value is recorded for each rotation speed that can be switched;
   the control unit acquires a data transfer rate index value that is considered necessary on the basis of the data transfer rate index value at a rotation speed before the data transfer request and the data transfer rate index value of the interface unit relating to the data transfer request, and determines a rotation speed that satisfies the acquired data transfer rate index value, to judge necessity of switching the rotation speed; and
   wherein the control unit adds the data transfer rate index value at the rotation speed before the data transfer request to the data transfer rate index value of the interface unit relating to the data transfer request, and takes a sum obtained or the sum multiplied by a predetermined value, as the data transfer rate index value that is considered necessary.

2. A disk-type storage medium driving apparatus of claim 1, wherein:
   the data transfer rate index value recorded for each communication interface unit in the interface management table is an effective value of a data transfer rate.

3. A disk-type storage medium driving apparatus of claim 1, wherein:
   the data transfer rate index value recorded for each rotation speed in the media management table is a media data transfer rate.

4. A disk-type storage medium driving apparatus of claim 1, wherein:
   the data transfer rate index value recorded for each rotation speed in the media management table is a media data transfer rate; and
   the control unit adds a minimum value or maximum value of the media data transfer rate to the data transfer rate index value of the interface unit relating to the data transfer request.

5. A disk-type storage medium driving apparatus of claim 1, wherein:
   the control unit selects a slowest rotation speed among rotation speeds that can be switched and satisfy the acquired data transfer rate index value.

6. A disk-type storage medium driving apparatus of claim 1, wherein:
   the disk-type storage medium is a hard disk.

7. A disk-type storage medium rotation speed control method for a disk-type storage medium driving apparatus that can switch rotation speed of a disk-type storage medium to drive the disk-type storage medium, comprising:
   performing data transfer to and from peripheral devices using at least one communication interface unit;
   judging a necessity of switching rotation speed of the disk-type storage medium when there occurs a data transfer request through any of the at-least-one communication interface unit;
   providing an interface management table in which a data transfer rate index value is recorded for each communication interface unit, and providing a media management table in which a data transfer rate index value is recorded for each rotation speed that can be switched;
   acquiring a data transfer rate index value that is considered necessary on the basis of the data transfer rate index value at a rotation speed before the data transfer request and the data transfer rate index value of the interface unit relating to the data transfer request, and determining a rotation speed that satisfies the acquired data transfer rate index value, to judge necessity of switching the rotation speed; and
   adding the data transfer rate index value at the rotation speed before the data transfer request to the data transfer rate index value of the interface unit relating to the data transfer request, and taking a sum obtained or the sum multiplied by a predetermined value, as the data transfer rate index value that is considered necessary.

8. A disk-type storage medium rotation speed control method of claim 7, wherein:
   the data transfer rate index value recorded for each communication interface unit in the interface management table is an effective value of a data transfer rate.

9. A disk-type storage medium rotation speed control method of claim 7, wherein:

the data transfer rate index value recorded for each rotation speed in the media management table is a media data transfer rate.

10. A disk-type storage medium rotation speed control method of claim 7, wherein:

the data transfer rate index value recorded for each rotation speed in the media management table is a media data transfer rate; and wherein the disk-type storage medium rotation speed control method comprises adding a minimum value or maximum value of the media data transfer rate to the data transfer rate index value of the interface unit relating to the data transfer request.

11. A disk-type storage medium rotation speed control method of claim 7, wherein the disk-type storage medium rotation speed control method comprises selecting a slowest rotation speed among rotation speeds that can be switched and satisfying the acquired data transfer rate index value.

12. A disk-type storage medium rotation speed control method of claim 7, wherein:

the disk-type storage medium is a hard disk.

* * * * *